(12) United States Patent
Persinger

(10) Patent No.: US 6,357,175 B1
(45) Date of Patent: Mar. 19, 2002

(54) METHODS FOR ENHANCING GROWTH AND MAINTENANCE OF WARM AND COOL SEASON GRASSES

(76) Inventor: James Persinger, 1115 Monroe, Hugoton, KS (US) 67951

( * ) Notice: Subject to any disclaimer, the term of this patent is extended or adjusted under 35 U.S.C. 154(b) by 0 days.

(21) Appl. No.: 09/502,880

(22) Filed: Feb. 11, 2000

(51) Int. Cl.$^7$ .............................................. A01G 29/00
(52) U.S. Cl. ...................... 47/48.5; 47/62 N; 47/58.1; 47/DIG. 10; 71/60; 71/54; 71/56
(58) Field of Search ............................. 47/58.1, 62 N; 71/60, 54, 56

(56) References Cited

U.S. PATENT DOCUMENTS

| | | | | |
|---|---|---|---|---|
| 4,308,844 A | * | 1/1982 | Persinger | 123/539 |
| 5,192,355 A | * | 3/1993 | Eastin | 71/54 |
| 5,697,187 A | * | 12/1997 | Persinger | 47/58 |

* cited by examiner

*Primary Examiner*—Peter M. Poon
*Assistant Examiner*—Andrea M. Valenti
(74) *Attorney, Agent, or Firm*—Frank Frisenda

(57) ABSTRACT

Unique methods for improving growth and maintenance of warm and cool season grasses are provided by treatment with prescribed irrigation solutions to improve water penetration and to increase soil oxygen, while, at the same time reducing water usage and inhibiting pathogens. In a presently preferred embodiment, the inventive method comprises the steps of producing a gaseous mixture of negatively charged ionized air including from about 50 parts per million to about 4,000 parts per million ozone, from about 1,000 parts per million to 20,000 parts per million oxygen ions, and from 2,000 to about 50,000 parts per million nitrogen oxides from ambient air; effecting direct contact between the ionized air gaseous mixture and a supply of water by means of a submicron injector to produce a substantially dissolved gaseous solution for irrigation of a wide variety of warm and cool season grasses. Accordingly, by treating these grasses with the novel high dissolved oxygen irrigation solution a higher quantity and healthier more vigorous plant growth is achieved.

6 Claims, 2 Drawing Sheets

METHODS FOR ENHANCING GROWTH AND MAINTENANCE OF WARM AND COOL SEASON GRASSES

BACKGROUND OF THE INVENTION

The subject invention relates to methods for improving turf growth and maintenance through the use of novel irrigation solutions. In more detail, the inventive method provides the turf or other grasses with irrigating solution enriched with air, ozone, oxygen, and nitrogen oxides ions within a prescribed range.

A healthy lawn is comprised of thousands of individual grass plants, which in turn are made up of dozens of individual parts. Beginning at the top is the grass blade, the most visible part of the plant. But more importantly, at the base of the plant, next to the ground, is the crown. The crown supports the growth of visible grass blades and is essential to sod strength and density.

Shooting upward from the crown is the primary shoot, from which the grass blades originate. Secondary shoots, referred to as "tillers", also grow from the crown providing additional leaves essential to good sod density.

Below the crown are the roots, which spread out underground to absorb water, oxygen and nutrients and to anchor the plant. Creeping grasses spread by runners that go along the ground intermittently creating another grass plant. Rhizomes are underground, and above ground runners and referred to as stolons.

The subject invention is useful for treating a wide variety of grasses including all warm and cool season grasses.

In U.S. Pat. No. 5,697,187, the instant inventor disclosed a novel method for treatment of crops by an irrigation solution. In more detail, in one embodied form, the patented method comprises the steps of producing a gaseous mixture of ionized air with prescribed amounts of ozone, oxygen and oxygen ions and effecting direct contact between the ionized air gaseous mixture and a supply of water by means of a submicron injector to produce a gaseous solution for treatment of irrigation water to be applied to agricultural crops. Thus, by treating the crops during irrigation, the process is successful in stopping surface fungus and molds on plants above ground.

Crop-environment interactions are a very complex system and specific mechanisms are often hard to identify and isolate. Thus, occasional controversy over interpretations may occur; however, many facts are clear and beyond dispute. For example, when soils are depleted of essential inorganic nutrients readily identified deficiency symptoms usually appear. In other cases, such as with oxygen stress and the concurrent response to toxins that usually are produced, specific systems are more difficult to identify and isolate with present technology. It is commonly known that soil oxygen concentrations are in direct proportion to soil porosity and soil air content; thus, aeration is one variable that is directly affected by waterlogging (excess soil water). Waterlogging may occur naturally during a prolonged and intense rainfall or during excessive irrigation. waterlogged conditions restrict the supply of oxygen to plant roots and to soil micro-organisms (microbes) by displacing the soil air and slowing oxygen diffusion; thus, creating anaerobic (without oxygen) soil conditions and producing soil gases that can be toxic to plant growth.

In soils, adequate exchangeable calciums (the active calcium) is necessary to maintain good soil structure. Total soil calcium content is not necessarily a good indicator of structural conditions that a soil may possess; so, many other factors must be taken into consideration. Soil structure and its particle size distribution determines porosity and the ability of the soil to hold and release water to growing plants in addition to the aeration (oxygenation) status. Thus, factors which affect soil structure are important variables in plant nutrition.

The rate of oxygen used by plant and microbe respiration in soil can be very large in comparison with the amount contained in the volume of soil usually occupied by root systems. Anaerobic conditions develop when roots and soil microbes use oxygen for respiration faster than it can enter the soil through its numerous interconnected soil pores and does not necessarily require that waterlogged conditions exist.

Plant roots and soil organisms obtain energy in a series of enzyme driven reactions involving the transfer of electrons (negatively charged particles) through the oxidation-reduction process with the ultimate production of water and carbon dioxide. If insufficient amounts of molecular oxygen are present carbon dioxide formation is incomplete and toxic intermediates which are potentially harmful to plants are formed.

Since oxygen diffusion is 100,000 times slower in water than air, small increases in concentration can have a large effect on the amount of oxygen available for respiration. It is well known that nitrates and nitrogen dioxide are reduced to nitrogen gas through the action of denitrifying bacteria with the concurrent release of combined oxygen.

With respect to turf growth, those skilled in the art have recognized a significant need for improving root mass and sod strength and improve density of the turf in addition to suppressing fungal disease such as leaf rust that detracts from the visual appearance and plant health. The present invention fulfills these needs.

SUMMARY OF THE INVENTION

The present invention provides unique methods for improving growth and maintenance of warm and cool season grasses by treatment with prescribed irrigation solutions to improve water penetration, reduce water usage, increase soil oxygen and inhibit pathogens. Accordingly, by treating the turf and other grasses with the novel irrigation solution, enriched with dissolved oxygen, a higher quantity, healthier and more vigorous plant growth is achieved.

In a presently preferred embodiment, the inventive method comprises the steps of:

a) producing a gaseous mixture of negatively charged ionized air including from about 50 parts per million to about 4,000 parts per million ozone, from about 1,000 parts per million to 20,000 parts per million oxygen ions, and from 2,000 to about 50,000 parts per million nitrogen oxides from ambient air;

b) effecting direct contact between said gaseous mixture of ionized air derived from step a) and a supply of water by means of a submicron injector to produce a gaseous solution for treatment of turf and other grass sod;

c) continuing said contact between said gaseous mixture of ionized air and said water supply at the rate of 0.1 cfm to 2.0 cfm per 100 gpm of irrigation water; and (d) providing the resultant dissolved oxygen enriched gaseous solution to irrigate turf and other grasses.

DESCRIPTION OF THE PREFERRED EMBODIMENTS

The present invention provides unique methods for improving growth and maintenance of warm and cool season grasses by treatment with prescribed irrigation solutions to improve water penetration, reduce water usage, increase soil oxygen and inhibit pathogens. Accordingly, by treating the turf and other grasses with the novel irrigation solution enriched with dissolved oxygen, a higher quantity, healthier and more vigorous plant growth is achieved.

In a presently preferred embodiment, the method comprises the steps of:
- a) producing a gaseous mixture of negatively charged ionized air including from about 50 parts per million to about 4,000 parts per million ozone, from about 1,000 parts per million to 20,000 parts per million oxygen ions, and from 2,000 to about 50,000 parts per million nitrogen oxides from ambient air;
- b) effecting direct contact between said gaseous mixture of ionized air derived from step a) and a supply of water by means of a submicron injector to produce a gaseous solution for treatment of all grasses;
- c) continuing said contact between said gaseous mixture of ionized air and said water supply at the rate of 0.1 cfm to 2.0 cfm per 100 gpm of irrigation water; and
- d) providing the resultant dissolved oxygen enriched gaseous solution to irrigate turf and other grasses.

Figure 1:
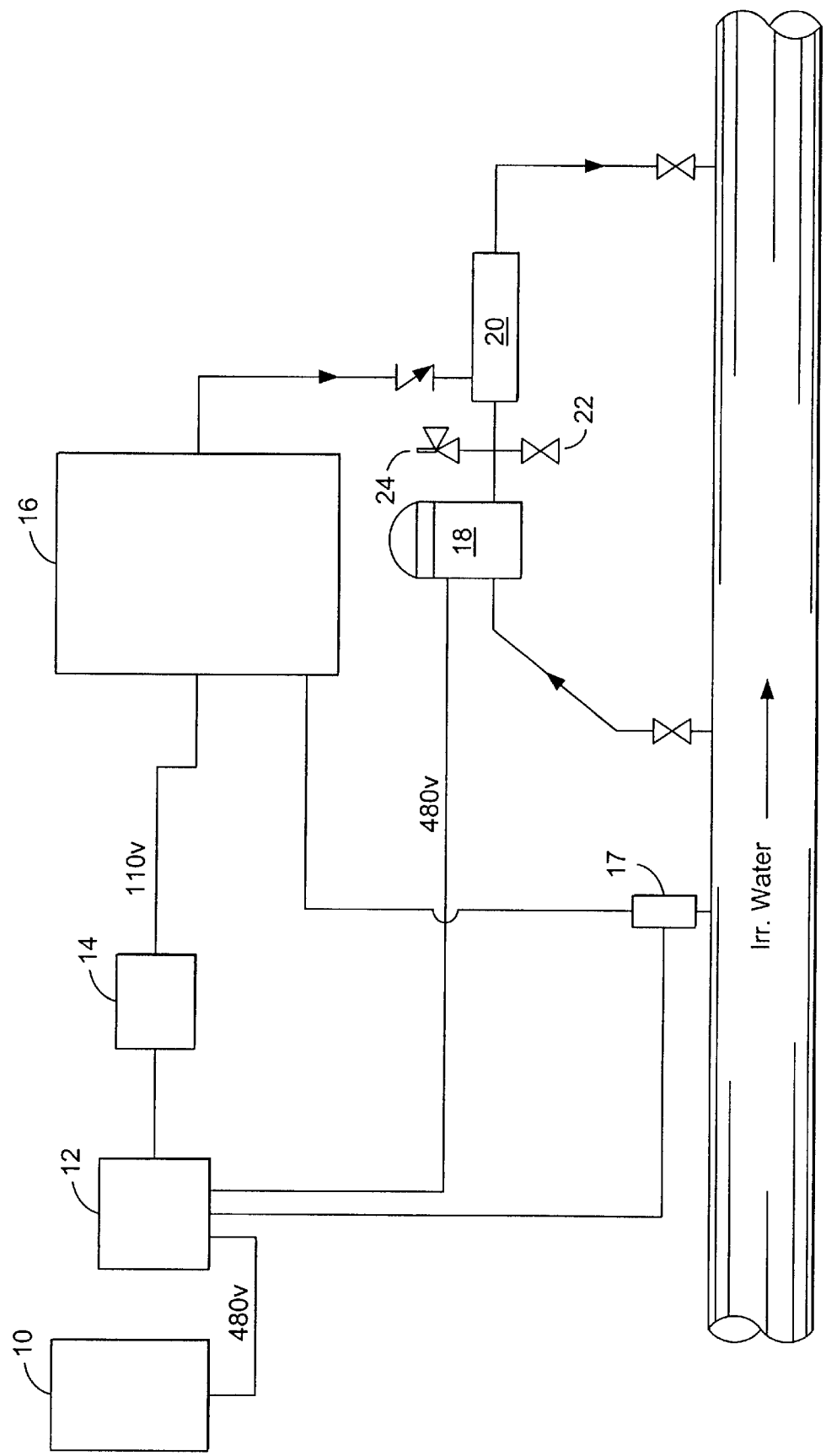
FIG. 1 is a schematic block diagram of one embodied method for improving turf growth and maintenance by preparation of novel irrigation solutions comprising prescribed amounts of negatively charged ionized air, ozone, oxygen, and nitrogen gases in accordance with the present invention.

FIG. 1 depicts a schematic block diagram of one embodied method for treatment of turf grass sod by means of the inventive irrigation solution comprising prescribed amounts of negatively charged ionized air, ozone, oxygen, and nitrogen gases in solution in accordance with the present solution. In more detail, as shown in FIG. 1, an irrigation sprinkler breaker 10 is provided with a disconnect and fuse box 12 and electrically connected to transformer 14 for activating and controlling the ionization unit 16. The ionization unit 16 produces a gaseous mixture of negatively charged ionized air including from about 50 parts per million to about 4,000 parts per million ozone, from about 1,000 parts per million to about 20,000 parts per million oxygen ions, and from about 2,000 to about 50,000 parts per million nitrogen oxides from ambient air. From the ionization unit 16, a direct contact is effected between the gaseous mixture derived from unit 16 which is regulated by pressure sensor 17 and fed through pump 18 to aspirator 20. The direct contact of the gaseous mixture of ionized air derived from unit 16 is admixed with a supply of water by means of a sub-micron injector to produce a gaseous solution for treatment of crops. The contact between the gaseous mixture of ionized air and the water supply is effected at a rate from about 0.1 cubic feet per minute to about 2.0 cubic feet per minute per 100 gallons per minute of water flow. Thereafter, the resultant gaseous solution is used to treat warm and cool season grasses crops by means of an inventive irrigation solution in accordance with the present invention.

As further shown in FIG. 1, for a pressurized system, the ionization unit 16 feeds the ionized air mixture to aspirator 20 which may be enhanced by means of manual drain valve 22 booster pump 24 to achieve the desired end resultant solution.

Figure 2:
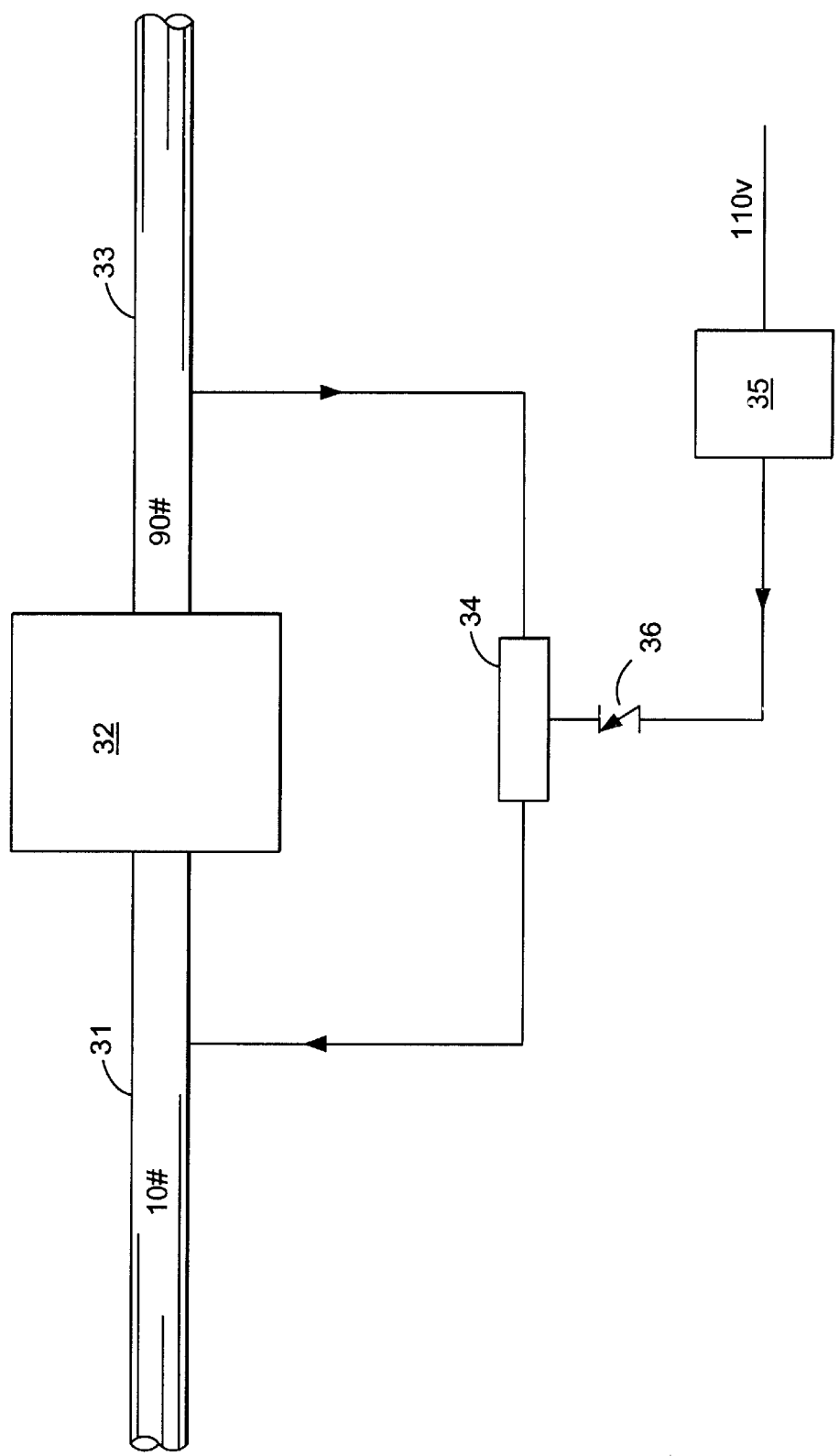
FIG. 2 is a cross-sectional view of one suitable ozone generator cell to produce the gaseous mixture in accordance with present invention.

In more detail, one suitable ozone generator means is; disclosed in U.S. Pat. No. 4,308,844 issued to James Persinger on Jan. 5, 1982. The apparatus, shown in FIG. 2, comprises an ozone generator cell 24 which acts on ambient air supply. The generator cell 24 produces ozone, oxygen and nitrogen oxides in the air supply. The generator cell 24 comprises metallic plates 47 and 50 disposed adjacent to one another and separated from each other by a dialectic material 45 and an air gap 44.

A potential is induced across the adjacent plates 47 and 50 causing negatively charged ionization of oxygen and nitrogen in the air flowing through the gap 44 which results in the production of ozone gas, nitrogen oxide and ionizing air particles.

In accordance with the present invention, the generator cell 24 produces ozone, oxygen and nitrogen oxides within the air supply and induces a charge of the mixture by applying an alternating potential of 15,000 volts across the plates 47 and 50. The potential across gap 44, alternating at a frequency in a range from about 60 to 400 cycles per second, produces ozone gas, nitrous oxide and adds a charge to the air supply.

As described above, the present invention may comprise multiple generator cells, preferably twelve, sequentially connected to produce the desired amount of ionized oxygen. one suitable ignition transformer for use with the ozone cell is available from Dongan Electric Manufacturing Company of Detroit, Mich. The specifications for the preferred ignition transformer is from about 5,000 volts to about 15,000 volts and preferably, has 15,000 volts production at 60 cycle.

If the ambient air is excessively wet, or contained polluting particulants, an air dryer and/or air filter may be used to remove excessive components prior to being fed into a compressor or air mover which flows the supply of air to the ozone generator cell.

Typically, the air supplied to the generator cells should have a minimum flow rate of about 0.5 to 4 cubic feet per minute per ozone generator cell. One suitable compressor for this purpose is commercially available from Gast Manufacturing of Bent Harbor, Mich.

ILLUSTRATIVE EXAMPLE

The inventive method is illustrated by the following representative treatment of turf grass sod by means of an high dissolved oxygen irrigation solution.

Turf grass was grown under irrigation with the normal field practices accepted by sod growers except that the water was treated in accordance with the present invention. An electrically treated airstream from about 50 parts per million to about 4,000 parts per million ozone, from about 1,000 parts per million to 20,000 parts per million oxygen ions, and from about 2,000 to about 50,000 parts per million nitrogen oxides was injected into the water stream every minute during irrigation and field observations were made by the sod grower.

The present invention's advantages and observations:
- a) Increase in root mass and sod strength by approximately 30%.
- b) Decrease in growing time to achieve necessary sod strength for harvest by approximately 30%.
- c) Decrease in field soil loss at the time of harvest due to increase in root biomass content of the sod pad harvested. The pad consists of more root material and less soil.
- d) Reduced weight of turf grass sod harvested due to a higher percentage of organic material in the sod pad.

Root mass is less dense and weight on a volumetric basis compared to mineral soil 10–20%.

e) Increased density of the turf due to an abundance of tellers (leaf shoots). The net effect is thick soft cushion of turf, ideal for a sports turf. Increase noted 30–40%.

f) Increased quality and intensity of green color due to plant vigor. Approximately 20–25% increase.

g) Increased germination of new seedlings and vigor of the young plants as they establish. Approximately 20–30% increase.

h) A near complete suppression of leaf rust 90–95% by comparison with other fields of comparable age and fertility. Leaf rust is fungal disease producing ugly lesions on the leaf tissue. It seriously detracts from visual appearance and plant health.

i) 10%–30% reduced water usage due to high dissolved oxygen improving water penetration.

Significant improvements were noted in the field on water penetration and the total water requirements to produce turf grass.

I claim:

1. A method for improving growth and maintenance of warm and cool season grasses through the use of an irrigation solution enriched with dissolved oxygen to improve water penetration, reduce water usage, increase soil oxygen and inhibit pathogens, the method comprising the steps of:

a) producing a gaseous mixture of negatively charged ionized air including from about 50 parts per million to about 4,000 parts per million ozone, from about 1,000 parts per million to 20,000 parts per million oxygen ions, and from 2,000 to about 50,000 parts per million nitrogen oxides from ambient air;

b) effecting direct contact between said gaseous mixture of ionized air derived from step a) and a supply of water by means of a submicron injector to produce a gaseous solution for treatment of all grasses;

c) continuing said contact between said gaseous mixture of ionized air and said water supply at the rate of 0.1 cfm to 2.0 cfm per 100 gpm of irrigation water; and d) providing the resultant dissolved gaseous solution to irrigate the grass to improve water penetration resulting in reduced water usage by 10% to 30%.

2. The method as defined in claim 1, wherein said resultant gaseous solution is used to irrigate will improve root mass by 30% to 60%.

3. The method as defined in claim 1, wherein said resultant gaseous solution is used to irrigate will reduce pathogens by 60% to 80%.

4. The method as defined in claim 1, wherein the resultant gaseous solution added to the irrigation water will increase the total dissolved oxygen by 15% to 55%.

5. The method as defined in claim 1, wherein said resultant gaseous solution used to irrigate will increase soil oxygen levels by 10% to 30%.

6. The method as defined in claim 1, wherein said resultant gaseous solution added to the irrigation water will produce nitrogen fertilizer at the rate from of about one pound to four pounds per hour.

* * * * *